United States Patent
Brown

(10) Patent No.: US 10,699,408 B2
(45) Date of Patent: Jun. 30, 2020

(54) DEVICE AND METHOD FOR TREE HEALTH ASSESSMENT

(71) Applicant: David Brown, Carlsbad, CA (US)

(72) Inventor: David Brown, Carlsbad, CA (US)

( * ) Notice: Subject to any disclaimer, the term of this patent is extended or adjusted under 35 U.S.C. 154(b) by 0 days.

(21) Appl. No.: 16/388,665

(22) Filed: Apr. 18, 2019

(65) Prior Publication Data

US 2019/0325576 A1   Oct. 24, 2019

Related U.S. Application Data

(60) Provisional application No. 62/659,605, filed on Apr. 18, 2018.

(51) Int. Cl.
*G06T 7/00* (2017.01)
*H04N 5/33* (2006.01)
*G06T 11/00* (2006.01)

(52) U.S. Cl.
CPC .......... *G06T 7/0012* (2013.01); *G06T 11/001* (2013.01); *H04N 5/33* (2013.01); *G06T 2207/10024* (2013.01); *G06T 2207/30188* (2013.01)

(58) Field of Classification Search
CPC .......... G06T 7/0012; G06T 220/30188; G06T 2207/10024; G06T 11/001; H04N 5/33
USPC ......................................................... 348/125
See application file for complete search history.

(56) References Cited

U.S. PATENT DOCUMENTS 9,984,455 B1 *   5/2018   Fox ........................ B64D 47/08

* cited by examiner

*Primary Examiner* — Hee-Yong Kim
(74) *Attorney, Agent, or Firm* — Donn K. Harms

(57) ABSTRACT

A tree examining system is provided which employs a thermographic image which electronically differentiates individual areas of a total area of a tree by areas according to temperature differential. Pixels in individual areas determined as abnormal are assigned a color which differentiates them from adjacent areas determined as normal. A displayable colorized image thereby produced provides a map viewable by a user to cut or trim the tree to remove the abnormal areas shown colorized therein.

9 Claims, 4 Drawing Sheets

DEVICE AND METHOD FOR TREE HEALTH ASSESSMENT

This application claims priority to U.S. Provisional Patent Application Ser. No. 62/659,605, filed on Apr. 18, 2018, which is incorporated herein in its entirety by this reference thereto.

FIELD OF THE INVENTION

The disclosed device and method herein relate generally to trees and other large plants. More particularly, it relates to a system for tree health assessment using a radiometric and infrared imaging component such as a camera which may be user held or used to obtain images remotely by positioning upon a flying drone.

BACKGROUND OF THE INVENTION

Pruning is a horticultural practice involving the selective removal of certain parts of a plant, such as with trees where branches are trimmed or removed. While there are many reasons for trimming trees and large plants, the removal of damaged tree portions is a primary concern. Such generally includes a targeted removal of diseased, damaged, dead, non-productive, insect infested, structurally unsound, or otherwise unwanted tissue from a tree or similar large standing plant.

In most trees, branches and even entire trees are known to die off for a number of reasons. Such may, for example, include age, light deficiency, heat damage, drought, damage from pests and disease, and root structure damage. At some point, such a dead or diseased tree branch will reach a point of decay where it will fall from the trunk or large branch of the tree. While normally this may be a very slow process, high winds or extreme temperatures can accelerate it.

However, because trees and branches are generally covered on all exterior surfaces with bark, such damage while extensive may not be visible. Because large trees have branches located in elevated positions, which can be many feet above the ground, safety is a significant reason to trim the tree prior to a branch falling which can cause significant injuries. Particular attention is generally paid to the inspection of and removal of dead or diseased branches where they overhang public roads, houses, and gardens. There are a number of conventional means for inspection, however some are destructive to the tree itself, and all are time consuming and inexact.

For example, a widely employed means for inspecting large trees and branches employs a mallet or baseball bat which is used to make contact with various points on suspected trees and branches. Each impact makes a sound which varies depending on the density of the tree or branch underneath the bark where the pole impacts. However, such is very inaccurate in that it requires interpretation of the various sounds by the inspecting person who can easily make mistakes. Further, since many trees are very tall and outside the reach of an inspector with a pole on the ground, higher branches are not well inspected if at all. This inaccurate method of inspection is also extremely time consuming and thus limits the number of trees inspected in a day or time period to a few.

Other inspection means use core drilling into the tree or branch which allows the inspector to view a core sample. This is even more time consuming than the sounding method above, and also risks the health of the tree or branch by leaving voids therein allowing insects or pathogens an easier route.

The device and method herein described and disclosed, provides a highly accurate inspection and review of tree and branch interiors to reveal detailed information concerning hidden damage from disease and insect pests. Using thermal imaging from an imaging device or camera, detailed cross-sectional imaging of an entire tree may be captured in seconds. These images provide the user with highly accurate positioning of any internal damage to trees and branches allowing trimming in a highly accurate manner heretofore unattainable.

The forgoing examples of related art and limitations related therewith in the area of tree and plant inspection for disease and damage are intended to be illustrative and not exclusive, and they do not imply any limitations on the imaging device and method described and claimed herein for tree and plant inspection for hidden damage. Various limitations of the related art are already known or will become apparent to those skilled in the art upon a reading and understanding of the specification below and the accompanying drawings.

SUMMARY OF THE INVENTION

In accordance with the objects of the present invention, as embodied and broadly described herein, the disclosed device employs thermal and radiographic image capturing and comparison technology to quickly ascertain the health of trees and branches extending therefrom. The system is thus enabled to ascertain with detail the health and structural soundness of trees and branches extending therefrom, even where determined damage is hidden by bark surrounding it.

Using a thermographic imager capable of capturing thermographic or radiographic images showing tree and branch interior structures, the system, employing a database of such thermographic images related to health as well as diseased and damaged trees and limbs, can determine with great accuracy trees having damaged structures in need of trimming or removal. Such thermographic images, for example, are available in camera form which have a charge coupled device (CCD) on which a lens projects an image captured through the lens. Such CCD components are available in modes to capture actual images or, for example, thermographic imagery which yield images of an object showing different temperatures projecting from a surface of the object, or other imagery not visible to the human eye.

As used herein, thermographic or radiographic imager means any electronic imaging device which may be aimed at an object and yield an electronic image of all or sectionalized areas of an interior of that object associated with a projected temperature of the individual areas imaged. Such may include passive imagers or may use active imagers where energy is directed at the object, and reflections of such energy are captured to yield imagery of areas of the interior of the object.

For example, passive thermographic imagers employ charged coupled device (CCD) technology which receives images of the objection and therefrom, can discern anomalies or abnormal sections in the underlying tree, between areas of normal wood of branch or tree trunk surrounding the abnormal section adjacent thereto. As used herein, abnormal section means areas in a thermographic image showing small temperature variants of 0.5-2° C.

In the device and method herein, such temperature differentials are correlated to density of the area of the abnormal section in the pixilated depiction, using prior wood and tree testing results and/or available libraries of such correlation of temperature differential in an abnormal area to wood density. Preferably herein, such thermographic images may be colorized by hardware or software running in memory engaged to a processor, acting to the task of receiving the electronic image for displaying the pixels of a video display, and associating standard colors into the displayed image in pixels on the video display, which correlate to differing temperatures of the object and its interior.

While thermographic imaging is especially preferred, active imagers for example, may also employ sonic generators which can direct sound waves at an object and capture reflections which vary electronically depending on the density of underlying wood and showing interior areas thereof. Also, by example of an active thermographic imager, millimeter wave transmitters can emit radio waves over and through an object such as a tree and produce a three-dimensional sectional colorized image relating to areas within the object and their density, by measuring the energy reflected back which varies depending on the density of the wood underlying the bark. Currently, a preferred imager is a thermographic imager since such technology is passive and benign to living objects, and does not structurally contact the object in any fashion, and is widely available in various CCD type cameras and imagers.

The thermographic imager herein may be hand held by a user and employed from the ground or mounted on an elevated platform. In the particularly preferred mode of the system herein positions the thermographic imager upon a drone aircraft. Thereafter the drone aircraft is flown to elevated positions which experimentation has shown to work best at substantially 15-35 feet away from the intended subject tree. The drone-mounted thermographic imager then captures one or a plurality of thermographic images from one or preferably a plurality of positions around the tree.

The images captured by the drone mounted or hand held thermographic imager may then be communicated to a computing device having electronic memory for the running of diagnostic software which receives the electronic image, ascertains abnormal areas therein, and assigns standardized individual colors to be displayed by the pixels of the captured image of the tree of object, based on the electronic signal from the CCD in the captured images. Such electronic signals show areas including electronic signals showing abnormal areas having differing temperatures from surrounding areas, are correlated to the density of the tree or object material in the respective normal and abnormal discerned areas within the tree of object. Standard colors are assigned to the pixels in the resulting displayable image, for both areas of the image discerned as normal, and respective individual areas where the above noted temperature differential is detected.

The computing device may also be in communication electronically directly or over a network, with one or a plurality of relational databases, containing thermographic images of trees, (or other objects) which are colorized or coded for color in the standard colorizing manner, where each color assigned to displayed pixels in the resulting image, correlates to different densities represented by the assigned colors, and the hidden underlying structural damage of such density variances. The saturation of the imparted color in each respective normal and abnormal area may also vary to show more saturated color in areas accessed as having higher abnormal readings as to damage.

The colorized thermographic images in the database are encoded with the same standardized assignment of colors to pixels in a tree image, which are discerned as normal and those which are discerned as abnormal areas. These standard colors directly correlate to differing types of normal, and more particularly, hidden structures, and problems therewith, within the tree or branches. Such color differentiated areas enabling such color cross-referencing thereby depicted in the pixels of a displayed image will correlate to prior-diagnosed trees and associate differing colorized pixel areas or sections of a digital tree image, with respective conditions of structural integrity of a respective species or type of tree.

Such color cross referencing or correlation of individual colorized pixels of areas of a digital image can, for example, directly relate to, and therefore diagnose in a compared captured thermographic image, trunk decay, rot, pest infestations, and the underlying structural strength of a tree in a captured digital thermographic image. Such is quickly and easily accomplished from such comparison of captured and standard colorized digital images to those in the database, to accurately assess the potential for failure and thus a risk to property and lives.

The system herein, as noted, has a library of assigned colors which correlate to specific types of damage or infestation assembled by testing. Additionally, thermographic images over time, taken by a thermographic imager can increase the database for associating assigned colors of pixels in abnormal areas, to specific interior damage, and be held in electronic memory in one or a plurality of databases.

The color associations to specific damage and the captured digital images with the same colors associated with tested and discovered damage and infestations, so held in memory, are thus directly correlatable to a type of structural integrity, damage, or lack thereof within a tree or branch. By thermographic images is meant any digital displayable electronic image taken by a thermographic imager, where standardized colors are assigned to pixels in areas of the digital image, based on the electronic signals captured for those areas.

As can be discerned, color assignment based on the electronic signals captured while initially unassigned or arbitrary, will thereafter be rendered visually to a user in standardized colorizations, each of which correlating stored electronic imagery in databases correlating density, damage, or infestation, in the abnormal pixilated areas. In this fashion, using newly captured thermographic images of trees and the like, which have standardized colors assigned to normal and abnormal pixel areas of the displayable image or image used for processing by software, will reveal individual internal structures of a tree or branch which are colorized as normal or healthy, and colorized respectively for specific types of damage or infestation correlating to the standard color assigned to the abnormal area and associated structural issues correlated thereto.

In the system herein, the database of thermographic images can be tree-species specific, such that for example, there are databases of elm trees, oak trees, and any other tree type. There may also be generalized thermographic images which are stored electronically with a plurality of standard colorized areas assigned to the pixels of the digital image which are associated to the normal or abnormal state of the underlying wood structure in areas of the tree based on the stored data correlating thereto. Thus, colors assigned to the pixel areas of the electronic images, once standardized by software for the user, and the brightness and saturation of the colors of the pixels in each defined normal and abnormal area, may be associated with the underlying wood structure. Thus, users may easily discern from a displayed image, areas which are normal and undamaged, and individual abnormal areas which are damaged by rot, damaged by insects, or having other damage. This is because each individual color assigned to normal areas and abnormal areas relates to the current condition of the wood in the underlying structure.

Because trees produce very low metabolic energy by comparison to other living organisms, most of the heat energy emitted from the surface of the trunk and limbs has previously been absorbed into the tree structure under the bark from the environment. Sound, healthy wood has good connectivity and water distribution between cells. The color assigned and associated by software operating to receive the electronic signal in the thermographic image can be saved in a library associated and thereafter used with such strong healthy wood. Using the database of prior images and pixel areas, the assigned colors for abnormal areas, and those for normal areas, such can be compared in the displayed captured thermographic images taken by the thermographic imager in real time, and various areas of the thermographic image of a living tree can be labeled as healthy or abnormal and unhealthy, such as lacking density.

In living trees being examined with the thermographic imager, if the normal function of the wood underlying the bark is disrupted by physical damage or the action of pathogens or insects or other influences, the flow of heat absorbed through the bark is interrupted and cooler areas become apparent in the colorized thermographic image. The greater the extent of cooling on an internal volume of wood such as where insects have eaten it or diseased dissolved it, the greater the effect on the temperature at the surface, which can be captured by a CCD in a thermographic image taken by the thermographic imager.

Using software running in electronic memory to the task of comparing colorized areas or pixels of recent or real time digital thermographic images of a tree, and the level of saturation of pixels to the color, to known images stored in the library of electronically stored thermographic images of the same or a similar tree, the software running to the task of image comparison, can compare the various areas of both images and ascertain areas of healthy wood and abnormal areas of damaged wood. The software can also operate in such a comparison to calculate the thickness of healthy wood to show a damaged tree is responding to surgery and treatment.

Further, software operating to the task of ascertaining a total area of the pixilated image can calculate the percentage of each individual discerned abnormal area showing a damaged portion of the tree or branches and the trunk with less density therein. Using this calculation of normal area and abnormal areas, the software can calculate a current, and potential future possibility of failure of any respective abnormal area, where the trunk or branch would break or fall. Such can include wind load calculations on the trunk or branch which would exert a force from wind to an abnormal area. Wind load is conventionally determinable in a variety of fashions and well known, such a determination of the area of the exterior of the tree or branch which will be contacted by wind at a rate of speed.

Thus, a failure potential score rating can be assigned to each individual abnormal area shown by colorization of the electronic image of the areas which correlate to damage or infestation, the percentage of total area of the branch or trunk occupied by such, the weight of the distal end of the branch or trunk supported by the abnormal area, and/or the wind load anticipated to be imparted to the abnormal. In this fashion, a ordered listing of remedies to take with the tree and be ascertained, based on the high to low scoring of the failure potential score and hazard discerned, for each different section having a colorized abnormal area in a current digital image. This calculation may also include pixel color saturation assignments by software of the individual colors assigned to the pixels in an abnormal area. For example, higher color saturation of the pixels in an abnormal area would show a user the increased damage to the interior and loss of density and strength in that area, and need to address the color saturated area first.

Many thermographic or in some cases ultrasonic imagers may be employed, so long as they yield a digital image of the tree, which includes differing electronic signals for pixels in each area of a tree or branch which correlate to a temperature in that abnormal area or correlated otherwise to a density in that abnormal area. For example, the system herein may employ an electronic thermographic imager from Flir Systems or cameras from Perfect Prime Company, or similar thermal imaging devices which will generate an electronic signal correlating to a digital image which is displayable in pixels, where areas having differing temperature, which are either discerned as normal or abnormal, and correlate to differing densities.

Once real time images or trees being inspected are captured electronically, the digital real time thermographic images have colors assigned to each individual normal and abnormal area of the digital image based on the electronic signal showing different temperatures in such sections which are correlatable to density and a calculable area of the section. Colorization is preferably standardized and assigned using software operating to the task of comparing the discerned areas of a current image, with the appropriate library of digital images held in electronic memory. The software running in electronic memory is adapted to compare library thermographic images which are already colorized in the standard fashion for each of the different normal and abnormal areas of the image, where the assigned colors of those areas are known to represent and be associated with, either healthy wood or wood with structural problems.

In the comparison of the real time thermographic image with library images by the software comparing the standardized assigned colors of both, a percentage of dysfunction can be assigned to a tree or areas thereof. This percentage of dysfunction can include a percentage of the whole which is discerned as problematic and can be used to calibrate probability of failure for each section identified as problematic.

The software is also adapted to the task of applying forces from wind loading to each section of the real time digital image which is associating damage with the underlying structure and to calculate a further potential contributor to failure.

A failure potential score or risk factor categorization of low, moderate, high, and severe can then be applied to each imaged abnormal area of each tree which has had a thermographic image captured in real time. Thereafter, portions of the trees may be trimmed or removed or otherwise treated based on the software-determined failure potential in a sequential order, from most likely to fail to least likely to fail based on the calculated probability of failure of the respective imaged areas of each respective tree imaged.

Using the system herein with thermographic imagers operatively engaged with flying drones, real time thermographic images can be taken from many angles. This allows software running to the task of assembling a 3D image of the tree, to form a 3D thermographic image on each of many trees being imaged, which may be employed with the noted software herein, and an image library to access each respective tree. This is an especially preferred option of the system since abnormal areas in 3D thermographic areas are more accurate as to the actual area of underlying damage as relating to adjacent areas of normal wood. Consequently, assembly of a 3D standardized color thermographic image for use in the same steps and fashion herein would be especially preferred for more accurate results.

Unlike prior art systems where very few trees can be examined only at ground level or low levels, the system herein can provide detailed health appraisals of the trunks and branches of hundreds of trees in a single day. Further, unlike conventional coring and sound tapping examination methods, the system herein provides highly accurate assessments of an entire tree without the need to climb trees or to break through the protective bark layer or reaction zones.

With respect to the above description, before explaining at least one preferred embodiment of the herein disclosed tree imaging and damage diagnosing system in more detail, it is to be understood that the invention is not limited in its application to the details of construction and to the arrangement of the components in the following description or illustrated in the drawings. The imaging and damage assessment system for trees and the like herein described and disclosed and depicted in the various modes and combinations, is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As such, those skilled in the art will appreciate that the conception upon which this disclosure is based may readily be utilized as a basis for designing other thermal and radiographic imaging systems for carrying out the several purposes of the present disclosed device. It is important, therefore, that the claims be regarded as including such equivalent construction and methodology insofar as they do not depart from the spirit and scope of the present invention.

It is an object of the present invention to provide a system for electronic imaging yielding electronic digital images representative of the internal structures of large trees and plants, which may be compared to a library of ailments relating to standard colorized sections, and to previous tree images to provide highly accurate failure assessments and trimming mapping of inspected trees.

It is another object of the present invention to provide such an imaging system which causes no physical damage to trees on inspection and which is accomplished in minutes or less thereby allowing inspection of large numbers of trees in a single outing.

These and other objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed tree inspection system herein. It is intended that the embodiments and figures disclosed herein are to be considered illustrative of the invention herein, rather than limiting in any fashion.

In the drawings:

FIG. 1 depicts an illustration of a particularly preferred mode of the system herein where a thermographic imager is operatively engaged with a flying drone and captures thermographic images of any or all of a group of trees individually, which can be software-compared to a library of known colorized normal and abnormal areas of thermographic images to ascertain both a risk assessment of failure and mapping of the tree for pruning and cutting.

DETAILED DESCRIPTION OF THE INVENTION

Figure 1:
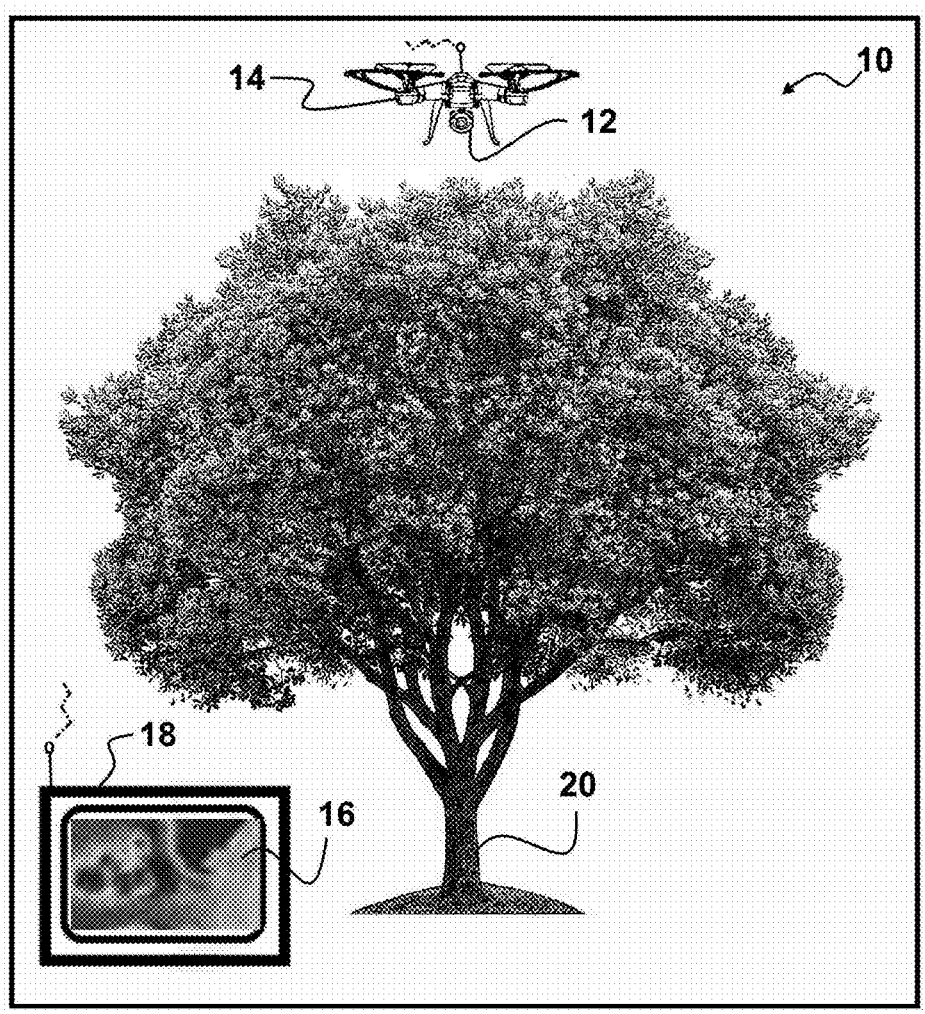

Now referring to drawings in FIGS. 1-5, wherein similar components are identified by like reference numerals, there is seen FIG. 1 which depicts an illustration of the system 10 herein. As shown, a thermographic imager 12 is employable herein to capture therormographic images 16 of one or a plurality of trees 20 in a given area. In a particularly preferred mode the thermographic imager is operatively engaged with a flying drone 14. In this fashion the drone 14 may be driven in the air to position the thermographic imager 12 to capture one or a plurality of thermographic images 16 of the tree or plant.

Where multiple thermographic images 16 of a the same tree 20 are captured, image assembly software running to the task of assembling the multiple thermographic images 16 into a 3D thermographic image 16 can be employed, to form a virtual 3D thermographic image 16 of a tree 20 which could be rotated on a display screen by a user to view the tree 20 from multiple sides thereof. Such software to assemble 3D imagery from multiple individual images is widely available for normal photography and employable in assembling 3D thermographic images 16. Software calculations based on colorized individual areas as to density and failure potential, is further aided by 3D imagery since the calculation is based on the area of underlying damage as a percentage of the adjacent areas 31 of the tree depicting as normal and healthy.

Such digital thermographic images 16 may be depicted in pixels upon an electronic display viewable by a user as a viewable map of the tree for decisions on cutting and pruning. These digital images may be stored in electronic memory which is accessible to computing devices. Software running to the task of receiving the electronic thermographic image 16 will discern the individual respective areas of pixels in the thermographic image 16, which electronically differ from adjacent areas in the image 16. Using these discerned electronic differences in the pixels in the respective image areas, the software running to the task will assign standardized individual colors to the pixels located in each respective area. Such pixel colors are assigned based on the specific electronic signal relating to the pixels in each given area discerned different from an adjacent area of the thermographic image 16 captured by the CCD in the imager.

Such electronic images in a CCD, configured to capture images of temperature differences between adjacent areas of a pixilated digital image, will produce the electronic thermographic image 16 with the individual pixels in areas of the image, electronically coded to correlate those pixels to the CCD-discerned temperature in those specific areas. Software running in electronic memory operatively connected to a processor, will assign the same respective standard color, to pixels located in each coded area of the thermographic image 16, which have the same electronic discerned characteristics as other such areas. Thus, areas with similar electronically discerned electronic signals of the pixels will be colorized with the same color.

Further, such electronic thermographic images 16, as is well known in the art, also can contain a "strength" of the discerned electronic signal of the pixels captured by a CCD in each area. In this fashion, pixels in the electronic image having a stronger signal for the discerned characteristic found matching in a database, can be differentiated by pixels have a weaker signal therefor. The software running on the system and assigning a color to pixels in this characteristic area, may thus assign a "brightness" or "saturation" to each pixel in each respective area being colorized, to cause the depiction of the tree to have more color saturation or less color saturation in the pixels in a colorized area showing an underlying physical characteristic of the trunk or branch. Such aids the user when reviewing a colorized depiction on an electronic display of the thermographic image to discern the areas most in need of remediation, such as cutting or trimming.

In addition to having a database of thermographic image signals relating to pixel signals correlating to a particular density and ailment which can be used to discern specific areas of the image having a particular density or other problem, the database can include an electronic library of thermographic images having pixels assigned in the common coloring scheme, where the same colors and saturation levels, are associated with and relate to the same underlying wood structure of a tree 20 captured in a thermographic image 16. In this fashion the system can increase accuracy over time with more and more comparison digital images in the database library to correlate to the electronic signature or signal of pixel areas of new images 16.

In all modes, the system 10, as noted, has a large library of individual thermographic images 16 of trees 20 or portions thereof, which are all colorized in a substantially identical fashion where each color represents an underlying wood structure of the tree 20. The system 10 employs software running in electronic memory of a computer which is configured to the task of comparing real time thermographic images 16 taken by the imager 12, to thermographic electronic images stored in electronic memory. This compares colorized areas of the real time thermographic image 16 to library images, to discern individual underlying structures of the differing pixel areas, to calculate a risk assessment of failure for each tree 20. Further, the resulting current thermographic image 16 may be communicated to a printed copy, or an electronic display, where it may be used by tree trimmers to trim or treat each tree accurately, by viewing the location of different colored pixilated areas which may also have more or less color saturation to indicated severity of an underlying structural problem.

Figure 2:
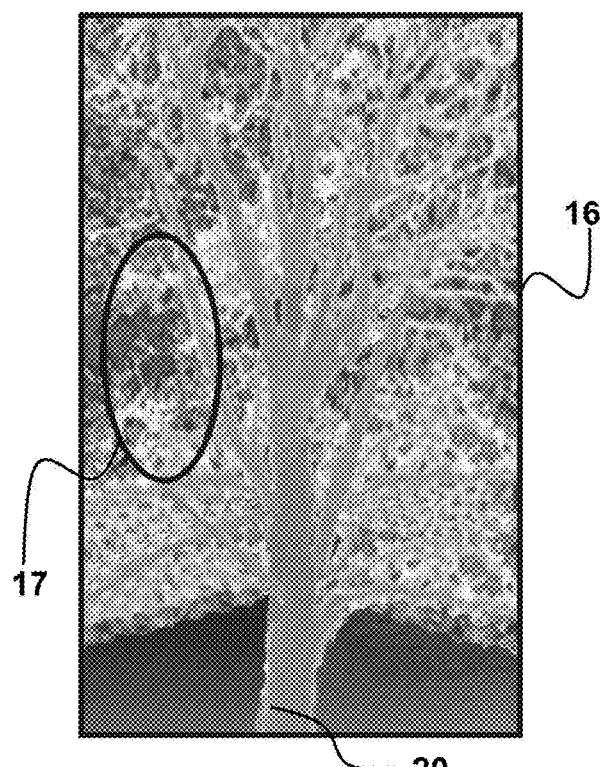
FIG. 2 shows an electronic thermographic image which has been colorized in a standard color scheme where differing colors represent differing structures beneath the bark of a tree.

In FIG. 2 is shown a representation of an electronic thermographic image 16 captured by the a thermographic image, which will be colorized in a standard color scheme for differing electronic signatures of pixilated areas as noted. In this fashion each color or shade and the saturation thereof, from a virtual infinite number of colors which may be depicted on a display, is assigned to areas of the electronic image, in a color or shade always which is pre-associated with similar or the same underlying areas beneath the bark of a tree 20.

The image shown in FIG. 2 can be either a real time image of a tree being examined or one of a large plurality of such thermographic images 16 stored in electronic memory which are colorized with the pixels in the respective color or shade always associated with a known specific underlying structure or density. Software of the system 10 is configured to the task of comparing the electronic signal of the pixels captured by a CCD real time thermographic image 16 to known pixel electronic signatures or configurations from a plurality of library of images, is employed in colorizing each captured thermographic image 16. As noted, using the resulting colorized image, which will colorize the different areas based on the underlying defect or lack of density or other factor, can then assign a risk assessment to each colorized area of each tree 20 imaged.

Figure 3:
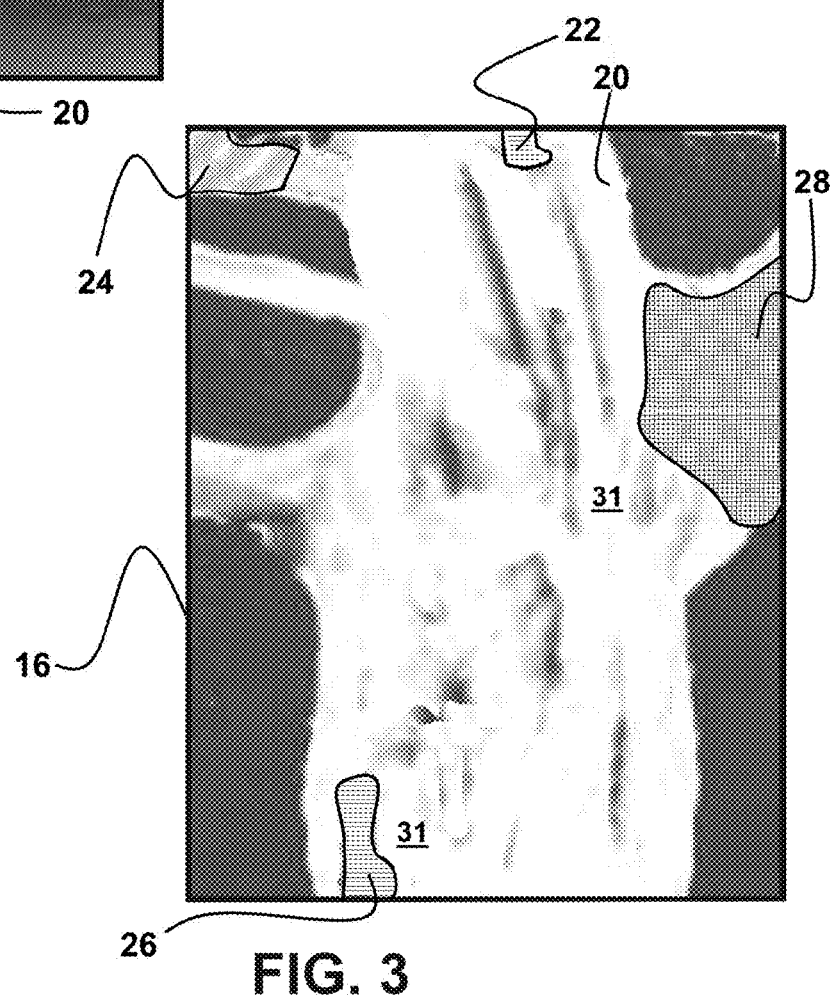
FIG. 3 shows an enlarged area of a thermographic image showing the differing colors representing the differing underlying structural integrity of different areas of the tree which may be employed for a risk assessment calculation and as a guide to tree trimmers to trim the tree or treat areas of infestation.

Shown in FIG. 3 is an example of a thermographic image 16 of an enlarged area 17 of a thermographic image 16 of FIG. 2. The displayable image shows the user, in easily discerned differing colored pixels in multiple respective areas, which represent differing underlying structural integrity of different pixilated areas of the tree 20, captured in a thermographic image 16 and colorized as noted herein. This forms a viewable depiction of the hidden interior condition of the tree 20 being examined showing colorized areas 22, 24, 26, and 28 which are identified by colorizing as having differing density or other correlated structural issues from that of adjacent areas 31 which have been correlated by software to be substantially normal underlying wood and structure, and not colorized specially.

Both a real time version of the thermographic image 16 of FIG. 2, as well as the enlarged section 17 of FIG. 2 shown in 3, can also be provided. In this fashion users viewing on an electronic display or the colorized image in a printed format, are provided a highly accurate mapping or guide as to where to trim the tree 20 or treat areas of infestation marked by specifically colored pixilation. A plurality of differing colors 22, 24, 26, 28, as noted, are imparted to the pixels in different discerned abnormal areas of the image, each of which may correlate to a known density or structural issue matched by software to such stored in the database. The respective colors are consistently associated with a specific underlying wood structure and/or structural integrity issue in the location on the tree 20 depicted. Underlying tree wood and structure matched by software to substantially normal wood 31 adjacent to colorized abnormal areas, may be left uncolorized.

Figure 4:
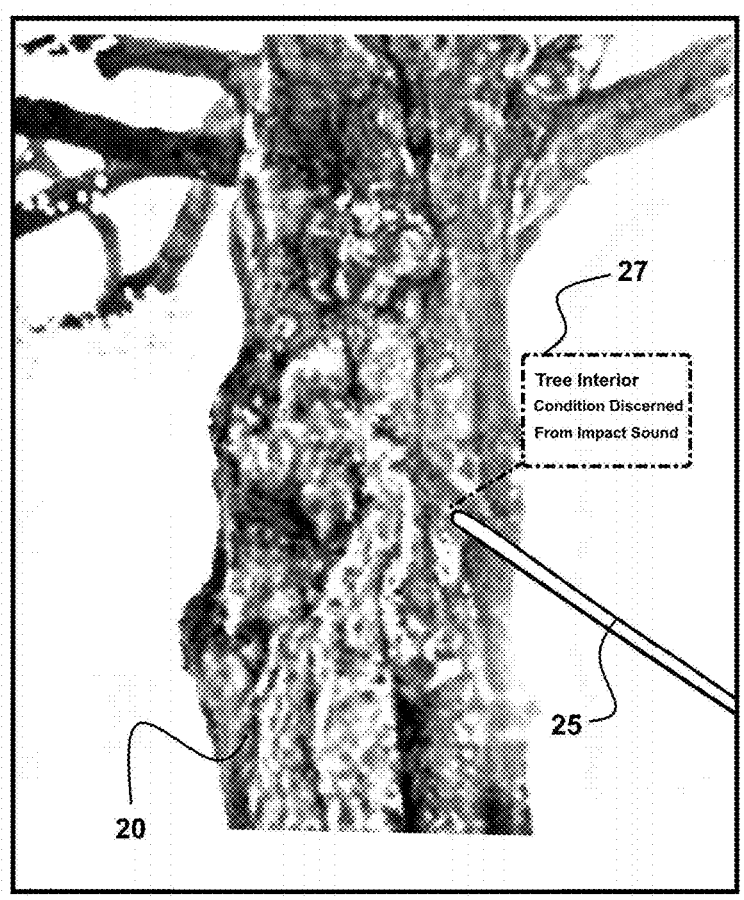
FIG. 4 depicts an example of one widely used prior art system for tree assessment where a pole is used to contact areas of the tree and the user accesses the underlying wood from the sound heard by the user.

Shown in FIG. 4 is a prior art example of one widely used prior art system for tree assessment. In this acoustic system, a pole 25 is used to contact against exterior areas of the tree 20 thereby making a noise. In this prior art method, the user accesses the construction and density of the underlying wood from the sound 27 heard by the user during such a contact. As noted, this prior art system is inaccurate at best as well as slow and lacks the ability to ascertain the underlying tree structure at higher elevations on the tree 20.

Figure 5:
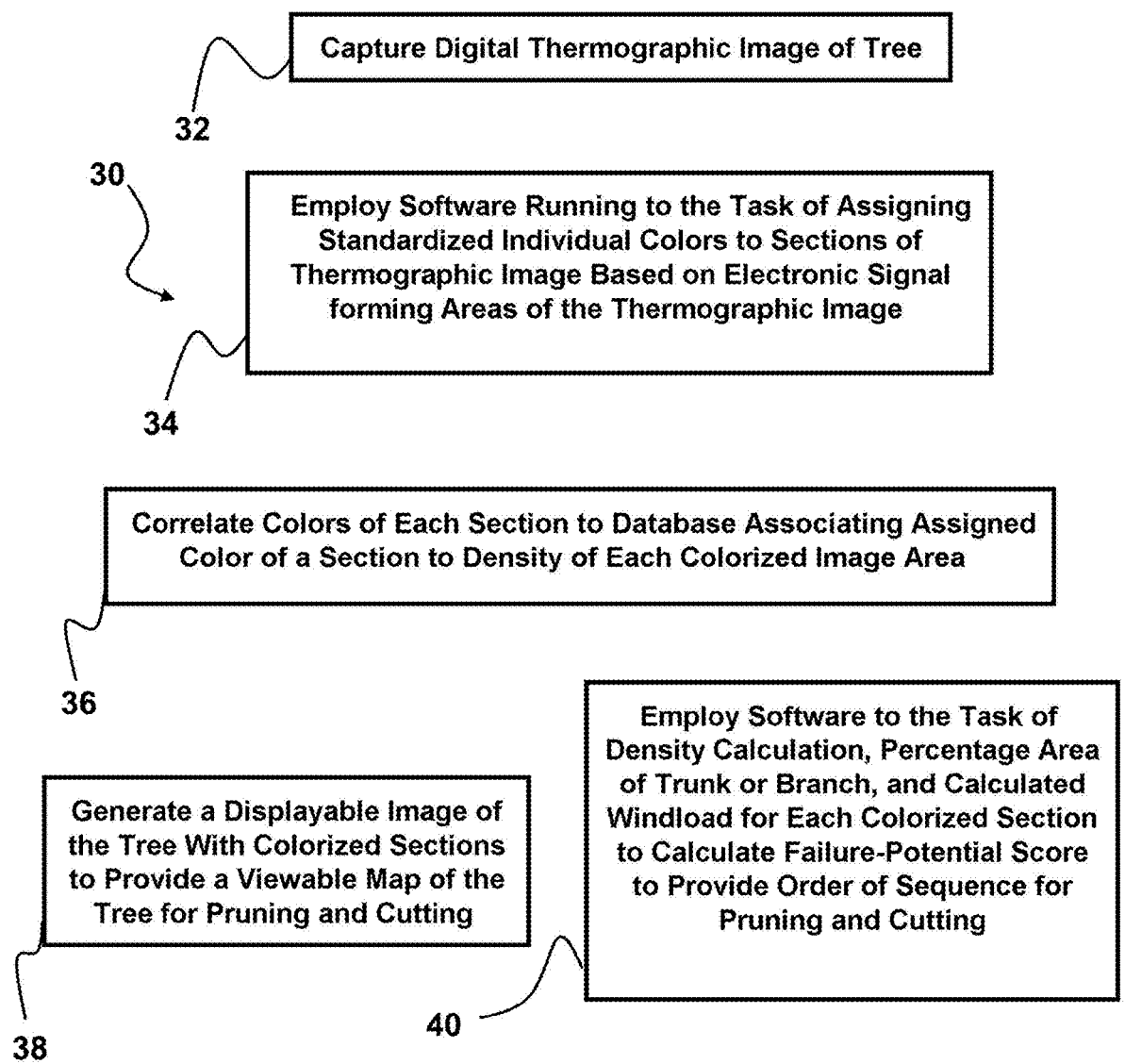
FIG. 5 shows the steps in the method of the system herein employing thermographic imaging to discern tree condition and to produce a displayable colorized image defining a map of the tree structure showing integrity issues to address and to calculate risk therefrom employable to work on the tree in a determined order.

In FIG. 5 herein is depicted the method 30 showing steps in the system herein using captured thermographic images of trees and the like, to generate a displayable image of a tree, which defines a map for trimming and pruning and to optionally include or calculate a failure potential score, to prioritize remedial actions on a given tree 20. As shown, using a thermographic imager, a digital thermographic image of the tree is captured to electronic memory 32. This thermographic image captured, include the step of assembling a 3D image of the tree, from multiple individual thermographic images thereof, using software running to combine multiple images from multiple angles, into a 3D thermographic image.

In a subsequent step 34, software running to the task of colorizing pixels of the thermographic image is employed to discern the electronic signals of pixels in individual respective areas of the tree in the image, which differ from the electronic signals rendering pixels of the image of adjacent areas 31 of the branches or trunk. The software compares the electronic signals of pixilated areas discerned as being different from adjacent pixilated areas, to a database which correlates a color, to particular pixels having a respective matched electronic signal to those assigned a color in the database. Thereafter, the system software imparts a specific color, to each respective area of the image having the respective pixels with an electronic signal or identifier matched to the same color in the database. The saturation of the assigned color may vary depending on the strength of the discerned electronic signal identifying the pixels in a given area.

With the image colorized with each area of pixels colorized to a matching correlated color, and at a saturation thereof relative to the identified pixels, in a next step 36, the colors assigned to each respective area and the saturation thereof if assigned, are compared by software to a stored database of colored pixels which correlate to a density of an area. Thus, varying densities of the underlying wood of the tree, in each respective colorized pixilated area of the image, can be discerned from high to low density.

Thereafter in a subsequent step 38, the system employs image processing software to generate a displayable image of a tree in question, thereby forming a viewable map of the tree showing colorized pixilated individual areas, of concern for a user to identify locations on the tree correlating to individual colorized areas as a guide for trimming.

In an alternate but preferred step prior to step 38, an intermediate step 40 may be employed to calculate a failure potential score, of each colorized area of the colorized image which have been correlated in the step 36 to density of each respective colorized area of the image. In this intermediate step 40, software running to the task of calculating the failure potential score, will at least ascertain the size of an area of a particular colorized portion of the image, relative to an area of branch or trunk portions 31 adjacent thereto, to calculate a potential for failure where the colorized area will break. Additionally considered in the calculation may be the force of windload on the branch or trunk and the increase therefrom for structural failure.

Using this calculated failure-potential software adapted to the task running on the computer in memory, will generate a sequence order for use with the generated colorized map 38, listing which colorized area representing an underlying structural issue on the colorized map 38 generated, to correct first through pruning or trimming. The sequence order generated will preferably list the colorized area of the displayable image with the highest failure-potential, to remedy first, and other colorized areas to be addressed in sequence according to the highest respective failure potential thereof.

It should be noted, that while the present invention has been described herein with reference to particular embodiments thereof and operation thereof, a latitude of modifications, various changes and substitutions are intended in the foregoing disclosures, it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A tree examining apparatus, comprising:
   a thermographic imager, said thermographic imager producing an electronic pixilated image of a tree, which electronically differentiates individual areas of a total area of said tree by temperature differential existing between such individual areas;
   a processor engaged with electronic memory running computer executable instructions performing the task of discerning abnormal areas of said image from adjacent normal areas of said image, where said abnormal areas have a said temperature differential of at least 0.5 degrees Celsius from said normal areas;
   computer executable instructions running in said electronic memory to the task of imparting one of a plurality of standard colors, to each abnormal area discerned, to thereby produce a displayable colorized image of said tree, said displayable colorized image having each said discerned abnormal area colorized with a said standard color; and
   said displayable colorized image defining a map viewable by a user to cut or trim said tree to remove the abnormal areas therein.

2. The tree examining apparatus of claim 1, additionally comprising:
   risk assessment computer executable instructions running in said electronic memory to the task of calculating a first size of each abnormal area and calculating a second size of said normal areas adjacent each said abnormal area within said displayable image; and
   said risk assessment computer executable instructions failure potential of each abnormal area in said displayable colorized image and producing an order of sequence for pruning and cutting said tree as a guide employed by said user to mitigate said abnormal areas in said order of sequence.

3. The tree examining apparatus of claim 1, additionally comprising:
said thermographic imager producing a plurality of said electronic pixilated images of said tree; and
assembly computer executable instructions running in said electronic memory to the task of receiving said plurality of said electronic pixilated images and forming said displayable colorized image in 3D.

4. The tree examining apparatus of claim 2, additionally comprising:
said thermographic imager producing a plurality of said electronic pixilated images of said tree;
assembly computer executable instructions running in said electronic memory to the task of receiving said plurality of said electronic pixilated images and forming said displayable colorized image in 3D; and
said risk assessment computer executable instructions employing a first size of a 3D abnormal area of said displayable colorized image and calculating a second size in 3D of said normal areas adjacent each said abnormal area within said displayable image to calculate said failure potential.

5. A method for examining a tree to determine hidden areas of damage to portions of said tree, comprising the steps of:
capturing a thermographic image of said tree using a thermographic imager;
determining abnormal areas of said thermographic image which have at least a 0.5 degree Celsius temperature difference from adjacent normal areas thereof;
assigning a color to pixels located within each said abnormal area from a library including a plurality of individual standardized colors where each color assigned to said pixels in a respective abnormal area, correlates to a color in said plurality relating to a density; and
generating a displayable image of said tree which includes each said abnormal area depicted in said color assigned thereto to thereby define a viewable map for cutting and pruning said tree by a user viewing said viewable map.

6. The method of examining a tree of claim 5 additionally including:
assigning a density to each abnormal area and calculating a failure potential score for each said abnormal area; and
generating an order of sequence for said cutting and pruning for said user where said order of sequence shows each said abnormal area in a sequence with from highest said failure potential score to a lowest said failure potential score for said user to view prior to said cutting and pruning.

7. The method for examining a tree of claim 6, additionally comprising the steps of:
generating said displayable image of said tree which includes each said abnormal area depicted in said color assigned thereto; and
saturating pixels in displayable image in said abnormal areas with a respective chosen said color in a color saturation which is higher for said abnormal areas having higher failure potential scores.

8. The method for examining a tree of claim 5, additionally comprising the steps of:
assembling said thermographic image from a plurality of thermographic images of said tree taken from different sides of said tree; and
generating said displayable image of said tree in 3D whereby said user can view said displayable image from multiple sides.

9. The method for examining a tree of claim 7, additionally comprising the step of:
assembling said thermographic image from a plurality of thermographic images of said tree taken from different sides of said tree; and
generating said displayable image of said tree in 3D; and
assigning said density to each abnormal area and calculating a failure potential score for each said abnormal area based on the 3D image.

* * * * *